United States Patent [19]

Horberg, Jr. et al.

[11] 3,843,286

[45] Oct. 22, 1974

[54] BLOW MOLDING APPARATUS

[75] Inventors: Charles Horberg, Jr., Northbrook; Richard K. Shelby, Hinsdale, both of Ill.

[73] Assignee: Monsanto Company, St. Louis, Mo.

[22] Filed: Nov. 12, 1971

[21] Appl. No.: 198,246

[52] U.S. Cl..... 425/387 B, 425/183, 425/DIG. 203, 425/DIG. 233, 425/DIG. 208
[51] Int. Cl............................................. B29d 23/03
[58] Field of Search .......... 425/326, 387, 249, 383, 425/384, 392, 398, 400, 403, 119, 183, DIG. 203, 387 B, DIG. 233

[56] References Cited
UNITED STATES PATENTS

| | | | |
|---|---|---|---|
| 2,348,738 | 5/1944 | Hoffmann | 425/387 X |
| 2,399,689 | 5/1946 | Miller | 425/183 |
| 2,864,124 | 12/1958 | Strauss | 425/387 |
| 3,060,506 | 10/1962 | Uschmann | 425/344 |
| 3,199,149 | 8/1965 | Croyle | 425/119 |
| 3,208,104 | 9/1965 | Hessel | 425/398 X |
| 3,258,813 | 7/1966 | Groth et al. | 425/384 |
| 3,412,186 | 11/1968 | Piotrowski | 425/387 X |
| 3,449,481 | 6/1969 | Tahara | 425/326 |
| 3,496,610 | 2/1970 | Shelby et al. | 425/403 X |
| 3,740,180 | 6/1973 | Sidur | 425/DIG. 204 |

FOREIGN PATENTS OR APPLICATIONS 2,048,636   4/1972   Germany

Primary Examiner—Andrew R. Juhasz
Assistant Examiner—David S. Safran
Attorney, Agent, or Firm—Michael J. Murphy

[57] ABSTRACT

An improved apparatus for rapidly and smoothly opening and closing partible sections of a blow mold which includes actuating means for substantially symmetrically reciprocating opposing blow mold sections on guide means into and out of abutting relationship with each other and means for intermittently imparting accelerating and decelerating motion to the actuating means. The actuating means preferably includes an eccentric member associated with each opposing mold section through a pivotally mounted crank. When the article being molded has a raised base portion, the mold may include special base means reciprocably mounted for movement in timed relation to the remaining sections of the blow mold.

2 Claims, 9 Drawing Figures

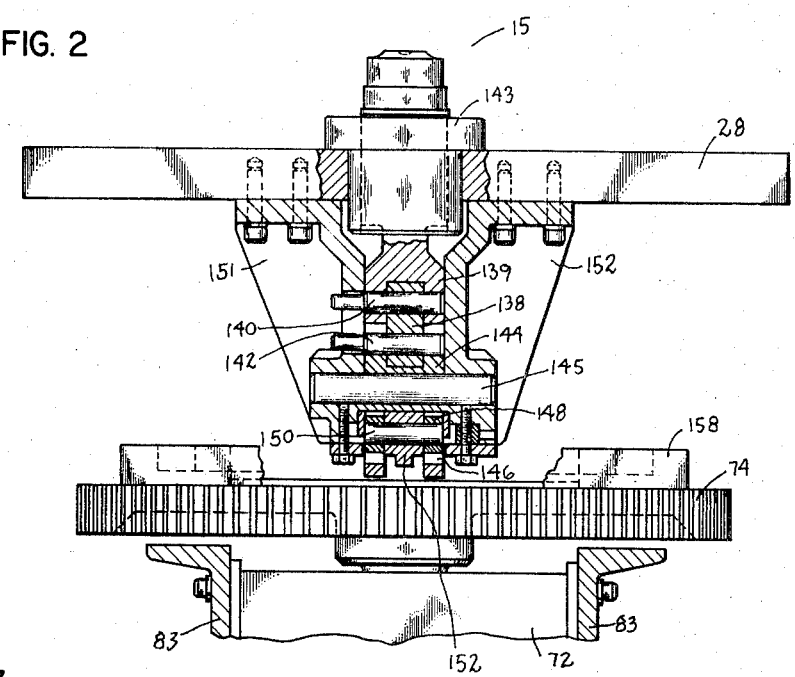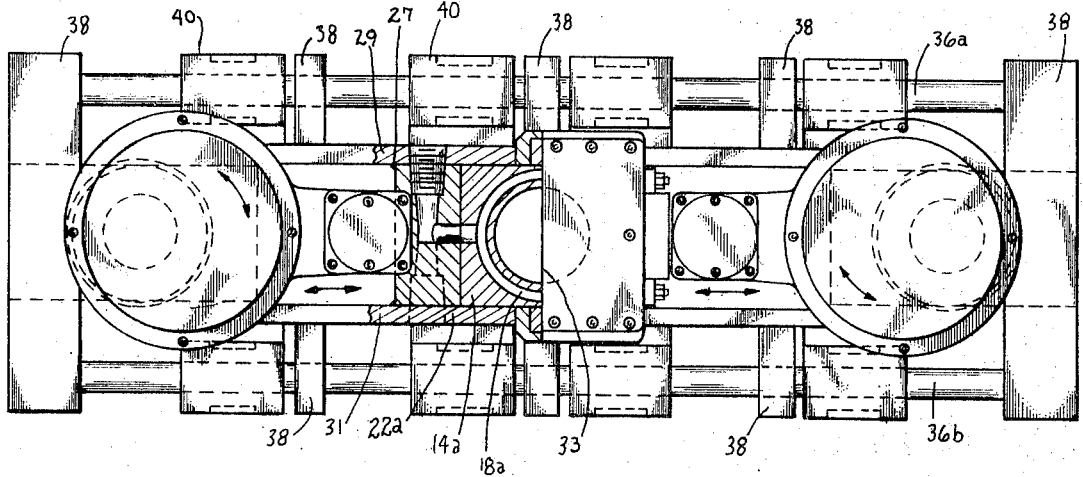

INVENTORS
CHARLES HORBERG JR.
RICHARD K. SHELBY
BY
Michael J. Murphy
ATTORNEY

PATENTED OCT 22 1974

3,843,286

INVENTORS
CHARLES HORBERG JR.
RICHARD K. SHELBY
BY
Michael J. Murphy
ATTORNEY

BLOW MOLDING APPARATUS

BACKGROUND OF THE INVENTION

The present invention relates to blow molding apparatus and more particularly to an improved means for operating sections of a split blow mold.

In view of the ever increasing competitive conditions in the marketplace today, a continuing need exists for high speed, low maintenance blow molding equipment for forming hollow articles from tubular sections of thermoplastic material. A known approach to a multiple installation, minimum cost, large volume, blow molding facilities network has been the so called two step process where preforms, either closed or open ended, are shaped at one or more central locations where relatively expensive, technically sophisticated, heavy duty extrusion equipment is housed, and then shipped to various remote satellite plants where they are blow molded into the final article configurations. With this approach, the key equipment components at such satellite facilities may be kept at a minimum and usually need only include some means for reheating the preforms to molding temperature plus one or more blow molding stations capable of forming an article relatively rapidly, e.g., on the order of a few seconds or less. With such especially high production rates, the molded articles, when in the form of containers such as bottles, can be fed directly to a high speed automated container filling line at a rate approximately corresponding to the usual capacity of such a line, thus providing overall, a highly integrated system.

Needless to say, the mechanism used to operate the sections of the blow mold must be mechanically capable of prolonged service under rather severe high speed operating conditions without requiring excessive down time for maintenance, if the economics of such a system are to be fully realized. This requirement means that the mold closing mechanism should tightly close the mold sections rapidly and without slamming, in order to avoid early mechanical fatigue of the parts, as has been the case with various types of prior art systems.

In addition, when the blown hollow articles are bottles for holding products under pressure, it is generally desirable to design the base portion of such a bottle to be convex inward in order to minimize high stress concentration areas in the lower portion of the bottle. As set forth in copending application Ser. No. 102,783, filed Dec. 30, 1970, now U.S. Pat. No. 3,718,416, assigned to the assignee of the present invention, some sort of special relieving type structure must usually be incorporated into blow molds for shaping such articles in order to permit opening the molds without fracturing the formed and fairly well solidified thermoplastic container. Needless to say, such a mold component capable of functioning relatively flawlessly in combination with the remaining parts of the blow mold station imposes yet an additional difficult burden on the design of an efficient equipment system.

SUMMARY OF THE INVENTION

Accordingly, it is a principal object of this invention to provide improved blow molding apparatus capable of functioning smoothly, rapidly and accurately over long periods of time without excessive maintenance requirements.

An additional object of this invention is to provide an improved mechanically operated system for moving separable sections of a blow mold into and out of molding position.

A further object of this invention is to provide a system of the foregoing character which is capable of cycling at very high speeds while forming hollow articles having an inwardly projecting raised base portion.

Another object of this invention is to provide improvements in a blow mold for forming a bottle having an inwardly projecting base portion.

An additional object of this invention is to provide a system of the foregoing character for manufacturing hollow articles from tubular thermoplastic material in which non-symmetrical positioning of the thermoplastic between sections of the blow mold is obviated.

A further object of this invention is to provide a novel machine of the foregoing character in which actuation of the component parts are accurately and positively coordinated and synchronized.

Other objects of this invention will in part be obvious and will in part appear hereinafter.

These and other objects are accomplished in an apparatus for opening and closing a split mold by providing in combination, split mold means, guide means for supporting the split mold means, actuating means for substantially symmetrically reciprocating sections of the split mold means on the guide means into and out of abutting relationship with each other, means for intermittently imparting accelerating and decelerating motion to the actuating means, and drive means for effecting movement of the intermittent means.

The actuating means preferably includes a pair of rotatably mounted shafts operatively connected to the intermittent means, an eccentric member mounted on each shaft and a crank portion attached to each eccentric member and pivotally associated with opposing sections of the split mold means by means of a wrist pin rotatably mounted in a block secured to each such opposing mold section.

The intermittent means preferably includes gear means such as a single bull gear operatively connected to each member of the pair of rotatably mounted shafts. The means for imparting accelerating and decelerating motion to the actuating means may comprise either a Geneva or a conjugate cam assembly.

When the article being molded has a base portion projecting inwardly into the article, a novel movable base means is preferably employed which includes an elongated plug member having a mold shell portion on its forward end, temperature conditioning means for regulating the temperature of the shell portion, means for slidably reciprocating the plug member in timed relation to movement of the remainder of the split blow mold, and adjusting means for positioning the upper surface of the mold shell portion relative to adjacent surfaces of the remainder of the split blow mold.

The reciprocating means for the plug member preferably includes an oscillatable link member operatively connected to the plug member and to an arm radially movable with respect to the axis of the plug member. The adjusting means for positioning the mold shell portion of the base means preferably comprises a shim member seated on a ledge formed in the plug member.

BRIEF DESCRIPTION OF THE DRAWINGS

In describing the overall invention reference will be made to the accompanying drawings wherein:

FIG. 2 is a vertical schematic view, partly in section taken along the line 2—2 of FIG. 1;

FIG. 3 is a plan view of the apparatus of FIG. 1;

FIG. 4 is a partial, sectional view of an alternative type of blow mold operable in the apparatus of FIG. 1;

DETAILED DESCRIPTION OF THE ILLUSTRATED EMBODIMENTS

Figure 1:
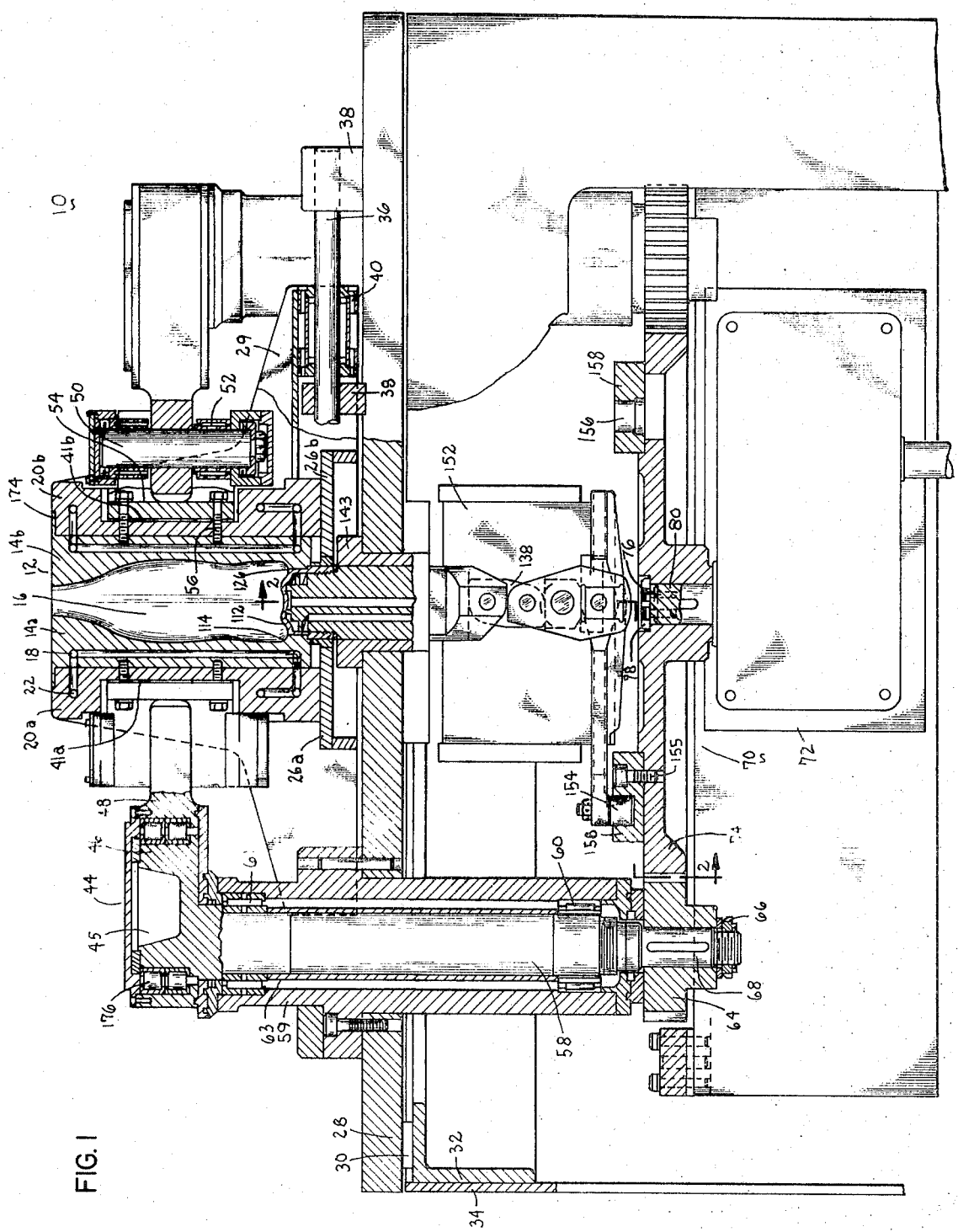
FIG. 1 is a vertical, schematic, front view, partly in section, of an apparatus assembly embodying the present invention.

Referring now to the drawings, there is illustrated in FIG. 1, an apparatus generally indicated as 10 for opening and closing a split blow mold. Apparatus 10 comprises split mold means 12 which includes opposing article body forming sections 14a and 14b which in closed position define cavity 16, the surface of which conforms to the shape of the body of a hollow article such as a bottle to be molded therein from heat plastified thermoplastic material. It should be realized that mold sections 14a and 14b could form two or more article forming cavities 16, as desired. Mold portions 14a and 14b have a series of channels typically illustrated as 18 formed therein for passage of a suitable cooling medium therethrough in order to set the thermoplastic of the article after it has been expanded outwardly against the surface of cavity 16. Mold portions 14a and 14b of split mold means 12 may be conventionally secured in mold carriers 20a and 20b which in turn are operatively associated with the remainder of apparatus 10 in a manner to be described hereafter in more detail. Alternatively, sections 14 of split mold means 12 may be individually connected directly to remaining portions of apparatus 10, however it is preferred to utilize carriers 20 since a single set of such carriers may be designed to accept a series of mold sections, each of which defines a somewhat different bottle configuration. In the illustrated embodiment of FIG. 1, coolant guide channels 22 are provided in carriers 20 for communication with channels 18 in each mold section 14, channels 22 in turn being connected into a suitable cooling means, not shown.

In the embodiment illustrated in FIGS. 1–3, split mold means 12 further includes movable base means 15 (FIG. 2), to be described hereafter in more detail and which is especially suitable in forming a hollow article having a raised bottom portion which is convex inward into the body of the article, since in molding such an article the mold portion defining said raised bottom should be moved out of the way prior to separation of sections 14 in order to permit release of the article from split mold means 12 without fracturing it. This is especially true when the thermoplastic being processed is relatively stiff in flow and non-pliable. It should be understood, however, that the apparatus for actuating split mold means 12 of the present invention is equally suitable for use with the more conventional type of blow mold wherein the bottom portion of the hollow article is either flat or not excessively raised so that the mold surface defining it may be an integral part of two separable sections, such as surfaces 24a and 24b of mold sections 25a and 25b in FIG. 4. In other words the mold opening and closing apparatus portion of the present invention may be utilized independently of the novel mold base means 15 illustrated in FIGS. 1 and 2 and more particularly in FIG. 5.

Each carrier 20 of split mold means 12 is secured, e.g., by a weld as illustrated at 27 in FIG. 3, to front and rear vertical support plates 29 and 31 respectively, a section of each of the latter being provided on either side of mold parting line 33 (FIG. 3). Each mold carrier 20 is further supported in the vertical direction on duplicate horizontal platform portions 26a and 26b.

Table 28 is provided for the upper portion of assembly 10 and is secured adjacent its edges to shims 30 (FIG. 1) which in turn are joined to L-shaped support members 32, the latter in turn being secured to vertical stanchions 34 which support table 28 on a suitable horizontal surface, not shown. Two horizontally extending guide rods 36a and 36b (FIG. 3) are provided for supporting split mold means 12 on table 28. Rods 36 are fixed vertically above the upper surface of table 28 in five guide rod support blocks 38 for each rod 36. Plates 29 and 31 on either side of parting line 33, which are secured to mold carriers 20, are also mounted by means of two bearing assemblies 40 secured to the front of each plate for sliding linear movement back and forth along guide rods 36.

Apparatus 10 further comprises pivotal actuating means for symmetrically reciprocating sections 14a and 14b of split mold means 12 on guide rods 36a and 36b into and out of abutting relationship with each other. Shims 41a and 41b, the thickness of which may be varied, are provided between the outer surface of a carrier 20 and adjoining block 54 for adjusting the clamping forces generated on the opposed mold sections during closing. The pivotal actuating means comprises for each opposing mold section 14a and 14b of split mold means 12, a movable member 44 which includes an eccentric portion 46 which may be hollow as at 45 to reduce weight, and a crank portion 48 rigidly secured to wrist pin 50 which is rotatably mounted by means of bearings 52 in a wrist pin block 54, which in turn is secured by means of bolts 56 to each mold carrier 20. The split mold actuating means further includes a pair of vertical crank shafts 58 which in the embodiment of FIG. 1 are shown integral with each eccentric member 46 and crank portion 48. Each shaft 58 is supported on table 28 by means of a support tube 59 and rotatably mounted by means of upper and lower bearings 60 and 61 vertically separated from each other by spacer member 63. A pinion gear 64 is mounted by means of lock nut 66 on the lower portion 68 of each crank shaft 58.

Means 70 are provided for intermittently energizing the split mold actuating means which includes means 72 (FIGS. 1 and 6) for imparting accelerating and decelerating motion to the actuating means. Intermittent means 60 includes, in the embodiment illustrated in FIG. 1, gear means such as bull gear 74 operatively enmeshed about its periphery with the teeth of each pinion gear 64, and secured by means of cap screws 76 and washer 78 to output shaft 80 of the means 72 for imparting accelerating and decelerating motion to the actuating means. In the embodiment of FIG. 1, means 72 comprises a commercially available conjugate cam type unit identifiable as model No. 512-P4H 40–90 manufactured by Commercial Cam and Machine Company, 400 No. Ashland Ave., Chicago, Ill., 60622. Means 72 are enclosed in a box which may be bolted in place (FIG. 2) between two upright carrier members 83 which in turn may be supported on a platform (not shown) tied into vertical stanchions 34.

Figure 6:
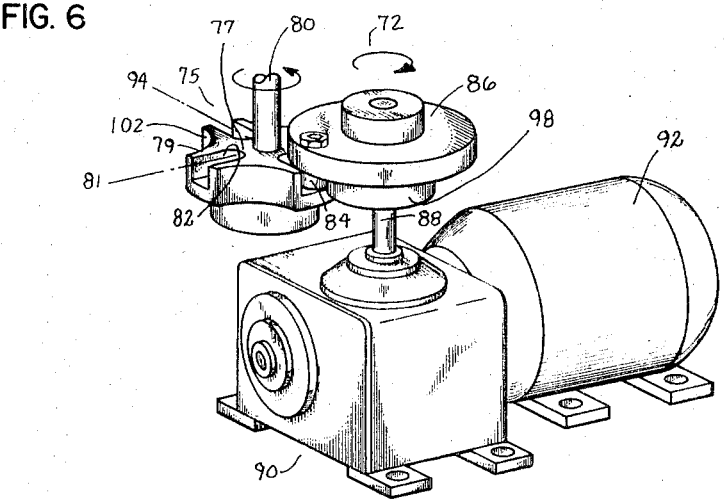
FIG. 6 is a schematic view of one form of drive means for the apparatus of FIG. 1.

An alternative form of means for imparting accelerating and decelerating motion to each shaft 58 and therefore to each movable member 44, is illustrated in FIG. 6 as Geneva assembly 75. Assembly 75 includes a Geneva wheel 77 having a series of arms 79 (four in the illustrated embodiment) outwardly extending from a central bore in which output shaft 80 is secured, the latter being identical in function to shaft 80 in FIG. 1. Each arm 79 has a contoured slot 82 formed therein within which cam follower 84 enters and leaves sequentially as drive wheel 86 rotates. More specifically, when continuously turning shaft 88 moves follower 84 away from line 81 by 45°, follower 84 moves into a slot 82. For the next 45° of rotation, i.e., until that slot reaches horizontal center line 94 in FIG. 6, the rotary speed of output shaft 80 having bull gear 74 (FIG. 1) mounted thereon is accelerating, because of the inherent characteristics of Geneva assembly 75. However, for the subsequent 45 degrees of rotation of wheel 77, the rotary velocity of output shaft 80 gradually smoothly decelerates whereupon cam follower 84 will exit from a particular slot 82. When such exit occurs, Geneva wheel 77, shaft 80 and all other mechanically interconnected portions of assembly 10 back to mold sections 14 will thereupon remain stationary while drive wheel 86 of Geneva assembly 75 continues to rotate for 270° whereupon follower 84 will enter the next slot 82 for another acceleration-deceleration cycle. During such rotary movement of wheel 86 while follower 84 is out of a slot, cylindrical surface 98 of a heel portion of drive wheel 86 remains in sliding rubbing contact with outwardly diverging contoured surface portion 102 intermediate adjacent arms 79 of Geneva wheel 77, thus preventing any lateral displacement between input shaft 88 and output shaft 80 of the accelerating and deceleration motion imparting means 72. Probably of more importance, however, such cooperation between surfaces 98 and 102 positively locks Geneva wheel 77 in position, thus preventing any unwanted rotary movement of output shaft 80 and the parts mechanically associated therewith during the dwell portion of the molding cycle, during which time tubular expansion and cooling or setting of the thermoplastic occurs. The heel portion of drive wheel 86 has a cutout section formed therein, not shown, which permits the Geneva wheel 77 to rotate with follower 84 engaged in a slot 82 without interference from the heel portion.

Apparatus 10 further includes a single drive means for effecting movement of intermittent means 77 and in turn simultaneous movement of both, or all three sections of split mold means 12. In the embodiment of FIG. 6, such drive means includes a continuously rotating gear reducer 90 connected to a conventional electric motor 92, output shaft 88 of gear reducer 90 serving to rotate drive wheel 86 of Geneva assembly 75. Obviously other alternative well known drive components may be employed. Also, though not shown, it is within the scope of the present invention to employ clutch means, which may be adjustable, as a part of the drive means for the purpose of extending the dwell or mold closed portion of the apparatus for an additional time increment in excess of that dictated by the intermittent means, thus increasing the versatility of the system.

Figure 5:
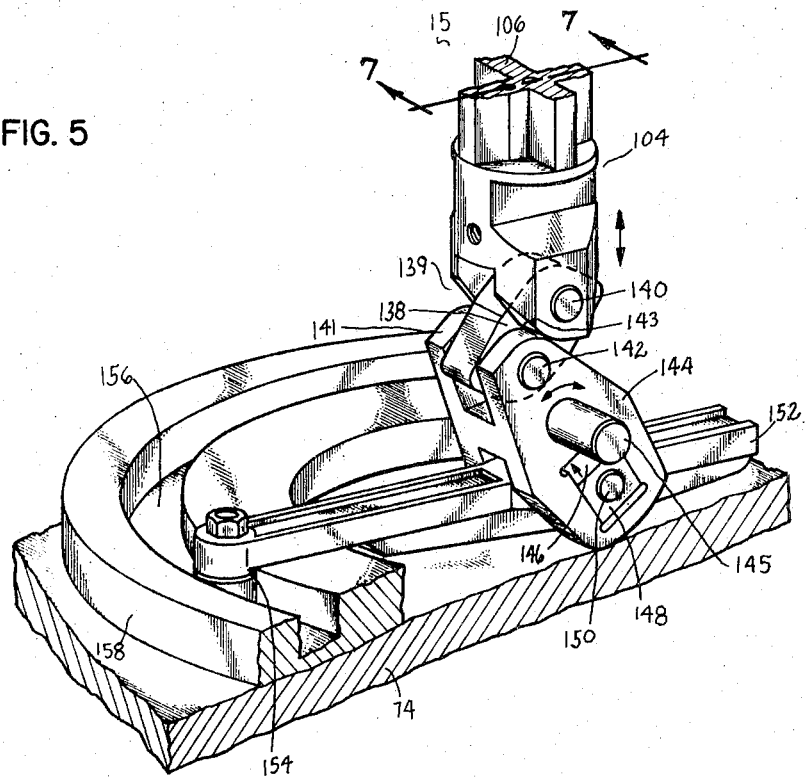
FIG. 5 is a partial, perspective view, partly in section of a portion of the apparatus of FIG. 1.
Figure 7:
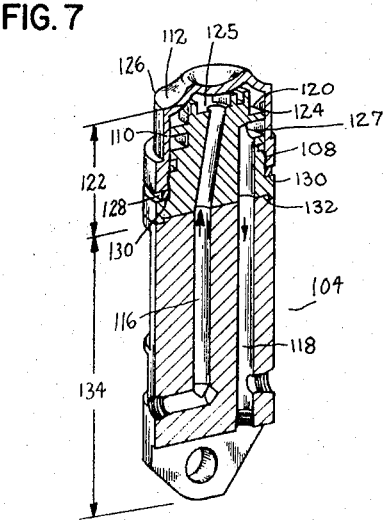
FIG. 7 is a vertical, sectional view of a portion of the apparatus of FIG. 5 taken along the line 7—7 of FIG. 5.
Figure 8:
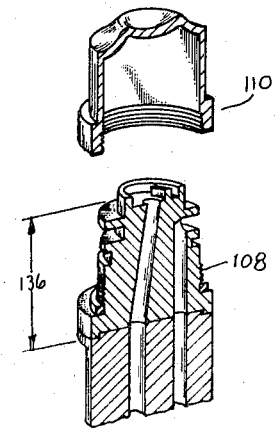
FIG. 8 is a partial, vertical, sectional view of an alternative form of the apparatus of FIG. 7.

Turning now to FIGS. 2 and 5, movable base means 15 of split mold means 12 comprises an elongated plug member 104 depicted more completely in FIG. 7. Plug member 104 is preferably fin shaped as at 106 as much as possible along its length in order to keep its weight at a minimum, and may have means such as threads 108 (FIG. 8) on its outer surface for mounting a mold shell portion 110 on its forward end, shell portion 110 having a surface configuration at its upper end conforming to that of the lower end of cavity 16 of split mold means 12. Though the separable construction of FIG. 7 is preferred for reasons to be explained more fully hereafter, mold shell portion 110 could be formed as an integral part of plug member 104. As illustrated in FIGS. 1 and 7, the configuration of shell portion 110 comprises upwardly convex surface 112 which in the mold closed position smoothly blends into the chime area 114 at the lower end of the article body forming surface of cavity 16. Plug member 104 is associated with temperature conditioning means, the function of which is to control the surface temperature of mold shell portion 110 when the latter is secured on plug member 104 via threads cooperating with those on plug member 104. Such temperature conditioning means includes fluid inlet and outlet channels 116 and 118 respectively in plug member 104 which are associated via conventional conduit and valving (not shown) with a suitable conventional source of temperature conditioning fluid, the temperature of which may be such as to increase, decrease or keep constant the surface temperature of portion 110. In the preferred embodiment of plug member 104 illustrated in FIG. 7, such temperature conditioning means includes a spiral passage 120 formed in the upper end portion of plug member 104, passage 120 being outwardly open directly to the underside 124 of mold shell portion 110 when the latter is in place on plug member 104. The smallest diameter section 125 of the spiral configuration communicates directly with fluid inlet channel 116, whereas the largest diameter of the spiral configuration opposite the sidewall part of mold shell portion 110 lying outside the mold cavity (FIG. 1) communicates directly with outlet channel 118. Such a spiral arrangement positively avoids any dead spots in the flow path of the temperature conditioning medium, provides for high velocity of such medium and therefore optimizes heat transfer contact between shell portion 110 and such medium during operation of the system.

Also included in movable base means 15 are adjusting means for positioning edge 126 of the outer surface of mold shell portion 110 relative to adjacent surfaces of the remainder of the split mold. This is best illustrated in FIG. 7 by noting the position of edge 126 of shell portion 110 with respect to the abutting edge 114 in the chime area of mold cavity 16. Though suitable resilient means such as a series of springs may be provided, the preferred form of adjusting means comprises a shim member 128 seated on ledge 130 formed in plug member 104. Since, as previously indicated and as is apparent from FIG. 1, mold sections 14 are carried independently of plug member 104, it is virtually impossible to have edge 126 of shell portion 110 match the abutting surfaces 114 of molds 14, and if such surfaces are misaligned an undesirable ring depression corresponding to the extent of the misalignment will be formed in the base of the molded bottle. By threading portion 110 on the end of plug member 104 and then machining shim member 128 as required, or in other words changing its vertical thickness, a smooth transitional joint between surface portion 114 and abutting edge 126 of convex upward portion 112 of mold shell 110 can be obtained. Alternatively, it should be realized that instead of machining, a series of shims of differing thicknesses may be provided and the one yielding the desired smooth joint selected.

Plug member 104 may obviously be formed such that it is separable along its length as at 132 in FIG. 7 into an upper portion 122 and a lower portion 134. With this arrangement, when it is desired to change the vertical dimension and therefore the internal capacity of the article being formed in cavity 16, it is merely necessary, to provide an upper portion 136 (FIG. 8) having a different axial length from that previously used (122 in FIG. 7) but which is otherwise adapted to be cooperatively mounted on a common lower portion 134 and to accept the same mold shell portion 110 as previously used. Alternatively, the plug member may be formed as an integral one piece unit and a series of shell portions provided to take up the difference in vertical dimensions, but this is not preferred since the advantages of the spiral temperature conditioning passage cannot be fully realized.

Movable base means 15 further comprises means for slidably, axially reciprocating plug member 104 in timed relation to movement of opposing sections 14a and 14b of split mold means 12. In the embodiment of FIG. 5, such reciprocating means includes a toggle link 138 pivotally secured at one end via pin 140 in a yoke portion 139 of the lower end of plug member 104, and at the other end via pin 142 in a cutout portion at the upper end of pivotable member 144. Pivotable member 144 has a slot 146 (FIGS. 2 and 5) formed therein in which slide block 148 is vertically movable. An actuating pin 150 extends horizontally through both a slot (FIG. 2) in a radially extending arm 152 and as well as through block 148, thereby securing slide block 148 and arm 152 together. Cam follower 154 is rotatably secured on the outer end of arm 152 for movement within track 156 of box cam 158. As best illustrated in FIG. 2, members 138 and 144 are supported in vertical position by a pair of carriers 151 and 152 which are bolted to the underside of table 28. Central or main pivot pin 145 secures pivotable member 144 to each carrier 151 and 152. Box cam 158, as illustrated in FIG. 1, is secured via bolts 155 directly to the upper surface of bull gear 74. Thus, cam 148 will rotate with bull gear 74, and cam track 156 is so profiled, generally in the shape of a cloverleaf, such that follower 154 will be driven in and out radially with respect to the longitudinal axis of plug member 104. When arm 152 moves radially to the right from the position shown in FIG. 5, slide block 148 in slot 146 of pivotable member 144 will cause member 144 to pivot about pin 145 and straighten up vertically, or in other words pivot to the right in FIG. 5. Such pivotal motion is transmitted directly to plug member 104 by means of toggle link 138 and the vertical center line distance between pins 140 and 142 is thereby increased to the extent of the pivotal movement of member 144. Curved bearing surface 143 of yoke portion 139 of plug member 104 will accordingly ride smoothly on opposing curved bearing portion 141 of pivotal member 144 as the latter moves to the right, and plug member 104 will move vertically within bushing 143 on table 28 a distance approximately equal to the amount the raised portion of mold shell portion 110 extends into cavity 16, i.e., on the order of ½ to 2 inches. With this arrangement of parts, no separate bearings are required. When arm 152 is caused to move to the left to the position shown in FIG. 5, the reverse movement occurs, i.e., plug member 104 is caused to reciprocate downwardly via oscillatable link member 138 to allow removal of the formed article from the blow mold without crushing it. As can be realized from FIGS. 2 and 5, the rather substantial forces exerted on shell portion 110 and therefore on plug member 104 as a result of the blowing pressure generated within the mold in fomring the container is transmitted to heavy support carriers 151 and 152 by means of the continuous contact between the arms of yoke 139 and pivotable member 144, the latter being firmly secured by central pin 145 to each carrier 151 and 152.

Figure 9:
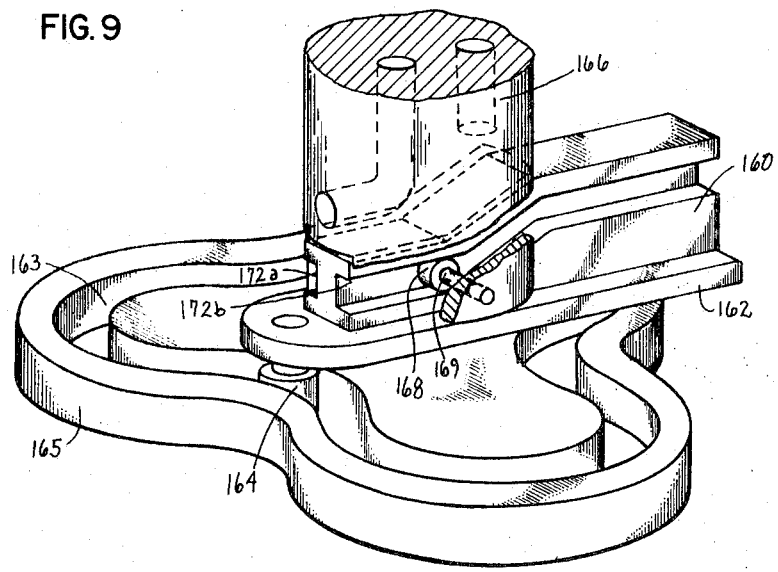
FIG. 9 is a perspective view of an alternative form of the apparatus of FIG. 5.

An alternative form of means for slidably reciprocating plug member 104 is illustrated in FIG. 9 and comprises a wedge shaped camming member 160, on a support plate 162 which may be an integral part of or separately secured to member 160. Rotatable cam follower 164 is operatively positioned on the end of plate 162 for movement within a cloverleaf track 163 of cam member 165 in the manner described for the embodiment illustrated in FIG. 5. Plug member 166 in the embodiment of FIG. 9, however, has dual followers 168 (only one shown) rotatably mounted on shafts 169 within a slot formed in its lower end. A follower 164 is driven by cam 165, followers 168 accordingly will move radially within tracks 172a and 172b formed on either side of wedge member 160 so as to raise and lower plug member 166 into and out of association with body forming sections 14a and 14b of split mold means 12 in the manner heretofore described.

In operation of the entire system, a suitable thermoplastic preform having either an open (mold of FIG. 4) or a closed end (mold of FIG. 1) is disposed within cavity 16 by means of a suitable support (not shown), for example in cooperation with a recess 174 formed in the top surface of each mold carrier 20. Such a preform is thereafter expanded outwardly by suitable conventional means (not shown) into conformity with the walls of cavity 16 so as to form a hollow article which, in the illustrated embodiment, would be a bottle. After a suitable time increment during which the thermoplastic forming the article sets or is cooled through contact with the surface of cavity 16 which is being cooled through circulation of a suitable medium through channels 18, the novel mold actuating means of the present invention is energized. This is accomplished through the means 72 in FIGS. 1 and 6 responsible for accelerating and decelerating the actuating means. With respect to FIG. 6, this occurs when follower 84 on continuously rotating drive wheel 86 of the Geneva mechanism enters a slot 82 on the Geneva wheel so as to turn the latter through 90° of rotation and accordingly turn bullgear 74 through 90° of rotation. Such rotation of gear 74 in the illustrated embodiment drives each pinion gear 64 through a full 360° of rotation due to the smaller (4/1) peripheral dimensions of the latter versus gear 74 though other ratios obviously can be used. Vertical crank shafts 58 are accordingly rotated through 360° which in turn rotates each eccentric member 46, 360° in bearings 176. As eccentric member 46 turns through an initial 180° this corresponds to the acceleration portion of the Geneva wheel rotation and accordingly each mold section will simultaneously move away from the other a distance of approximately 3 inches at an equal but ever increasing rate defined by the geometric characteristics of the intermittent means, the maximum speed increasing up to the half way point in the Geneva wheel movement. Rotation of eccentric member 46 causes crank portion to oscillate about wrist pin 50 which in turn causes plates 29 and 31 to which the mold sections are attached to slidably move outwardly on guide rods 36 by means of bearing members 40. As soon as the space between the simultaneously opening mold sections is incrementally greater than the greatest cross sectional dimension of the article, which, of course is before sections 14 are in their fully retracted position, the formed article is rapidly moved laterally out from between the sections by a suitable manual or automated means, not shown, to a downstream station and the next thermoplastic preform thereupon immediately moved into position between the open mold sections. Continued uninterrupted rotation of eccentric member 46 through an additional 180° is now controlled by the decelerating angular movement of the Geneva wheel, such that sections 14 will move inwardly at a rate of linear movement which gradually decreases smoothly to zero as the sections come gently together into fully closed position, thus avoiding any slamming contact. The preform is then blown and the thermoplastic allowed to set while the drive wheel of the Geneva assembly is caused to rotate through 270° by the continuously operating drive means, whereupon follower 84 enters the next slot on the Geneva wheel and the molds start to rapidly open once more. Obviously, the preform positioning means must be sufficiently fast moving as to be capable of locating a preform in place between the point in cycle when the mold sections are sufficiently separated as to be able to remove a formed article and the time when they have come sufficiently together again as not to be able to fit the next preform between them.

When base means 15 are employed with split mold 12, cam track 156 is so configured as to cause mold shell portion 110 on plug member 104 to move slidably downwardly in bushing 143 sufficiently to release the bottle from the mold before mold portions 14 start to move away from each other. Also, cam 158 or 165 should be designed to move plug member 104 upwardly into molding position before sections 14 are fully closed so that the plug member 104 carrying shell portion 110 can center mold portions 14 as they come together around these parts.

The above description and particularly the drawings are set forth for purposes of illustration only and are not to be taken in a limited sense.

Through the novel mold base means and mold opening and closing system of the present invention have been described as operable independently of adjacent extrusion or preform shaping equipment, it should be realized that the apparatus of the invention can be used in line or in conjunction with such adjacent extrusion and/or molding equipment to form articles directly from either an extrudate or from a preform at elevated temperature which has just been partially shaped upstream of the apparatus of this invention.

Various modifications and alterations will be readily suggested to persons skilled in the art. It is intended, therefore, that the foregoing be considered as exemplary only and that the scope of the invention be ascertained from the following claims.

What is claimed is:

1. Movable base means for a split blow mold comprising:
   A. an elongated plug member having a mold shell portion on its forward end;
   B. temperature conditioning means for regulating the temperature of said shell portion;
   C. means for slidably reciprocating said plug member in timed relation to movement of the remainder of said split blow mold, said means for slidably reciprocating said plug member including:
      a. an oscillatable link member operatively connected to said plug member and to an arm radially movable with respect to the axis of the plug member;
      b. cam means for radially moving said arm which includes a box cam mounted on a rotatable support and a roller follower for movement within the track of said box cam on rotation of said support; and
   D. adjusting means for positioning the outer surface of the mold shell portion relative to the adjacent surfaces of the remainder of the split blow mold.

2. The apparatus of claim 1 wherein said rotatable support

* * * * *

PO-1050
(5/69)

UNITED STATES PATENT OFFICE
CERTIFICATE OF CORRECTION

Patent No. 3,843,286    Dated    October 22, 1974

Inventor(s)  Charles Horberg, Jr. and Richard K. Shelby

It is certified that error appears in the above-identified patent and that said Letters Patent are hereby corrected as shown below:

Column 10, lines 51 and 52 cancel " 2. The apparatus of claim 1 wherein said rotatable support" and insert the following claim:

2. The apparatus of claim 1 wherein said rotatable support is a gear member portion of means for intermittently energizing actuating means for reciprocating body defining sections of said split blow mold toward and away from each other.

Signed and sealed this 1st day of April 1975.

(SEAL)
Attest:

RUTH C. MASON
Attesting Officer

C. MARSHALL DANN
Commissioner of Patents
and Trademarks